US012598113B2

(12) United States Patent
Gritli et al.

(10) Patent No.: US 12,598,113 B2
(45) Date of Patent: Apr. 7, 2026

(54) APPLYING MANAGEMENT CONSTRAINTS DURING NETWORK SLICE DESIGN

(71) Applicant: Telefonaktiebolaget LM Ericsson (publ), Stockholm (SE)

(72) Inventors: Nour Gritli, Montreal (CA); Maria Toeroe, Montreal (CA); Ferhat Khendek, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 114 days.

(21) Appl. No.: 18/561,737

(22) PCT Filed: May 25, 2022

(86) PCT No.: PCT/IB2022/054868
§ 371 (c)(1),
(2) Date: Nov. 17, 2023

(87) PCT Pub. No.: WO2022/249072
PCT Pub. Date: Dec. 1, 2022

(65) Prior Publication Data
US 2024/0235957 A1 Jul. 11, 2024

Related U.S. Application Data

(60) Provisional application No. 63/193,036, filed on May 25, 2021.

(51) Int. Cl.
H04L 41/342 (2022.01)
H04L 41/0893 (2022.01)

(52) U.S. Cl.
CPC ........ H04L 41/342 (2022.05); H04L 41/0893 (2013.01)

(58) Field of Classification Search
CPC .............. H04L 41/342; H04L 41/0893; H04L 41/5048; H04L 41/5045
See application file for complete search history.

(56) References Cited

U.S. PATENT DOCUMENTS

2018/0317134 A1 11/2018 Leroux et al.
2019/0327621 A1* 10/2019 Chou ...................... H04L 41/04
2021/0021494 A1* 1/2021 Yao ..................... H04L 41/0631

FOREIGN PATENT DOCUMENTS

WO 2022112820 A1 6/2022
WO 2022153121 A1 7/2022

OTHER PUBLICATIONS

International Search Report and Written Opinion, App. No. PCT/IB2022/054868 Aug. 24, 2022 18 pages.
(Continued)

*Primary Examiner* — Umar Cheema
(74) *Attorney, Agent, or Firm* — Sonoda & Kobayashi Intellectual Property Law; Darren M. Gardner

(57) ABSTRACT

A method of providing at least one Network Service (NS) to a Network Slice (NwS) during a design phase of the NwS based on a NwS Forwarding Graph (NwS FG) which comprises Network Functions (NFs) at a functional level, Virtual Network Functions (VNFs) and/or Physical Network Functions (PNFs) at a resource level, and embedding information for embedding the VNFs and/or PNFs (VNFs/PNFs) across more than one domain. The method determines, based on the NwS FG, Network Slice Subnets (NwSSs) for the NwS, wherein NFs comprising the NwS FG are grouped into respective groups to be managed by a respective NwSS manager. The method further maps the NwSSs to NSs based on Network Function Virtualization Orchestrator (NFVO) assigned to a domain, wherein at least some of the VNFs/PNFs managed by respective NFVOs are mapped to sites
(Continued)

across the multiple domains determined by the embedding information.

20 Claims, 9 Drawing Sheets

(56) References Cited

OTHER PUBLICATIONS

3GPP TR 28.801 V15.1.0, "3rd Generation Partnership Project; Technical Specification Group Services and System Aspects; Telecommunication management; Study on management and orchestration of network slicing for next generation network (Release 15)," Jan. 2018, 75 pages, 3GPP Organizational Partners.

3GPP TS 28.530 V16.0.0, "3rd Generation Partnership Project; Technical Specification Group Services and System Aspects; Management and orchestration; Concepts, use cases and requirements (Release 16)," Sep. 2019, 29 pages, 3GPP Organizational Partners.

CJ. Bernardos et al., "IPv6-based discovery and association of Virtualization Infrastructure Manager (VIM) and Network Function Virtualization Orchestrator (NFVO) draft-bernardos-intarea-vim-discovery-05," Feb. 22, 2021, 22 pages.

ETSI GR NFV-EVE 012 V3.1.1, "Network Functions Virtualisation (NFV) Release 3; Evolution and Ecosystem; Report on Network Slicing Support with ETSI NFV Architecture Framework," Dec. 2017, 35 pages, ETSI.

ETSI GR NFV-IFA 022 V3.1.1, "Network Functions Virtualisation (NFV) Release 3; Management and Orchestration; Report on Management and Connectivity for Multi-Site Services," Apr. 2018, 128 pages, ETSI.

ETSI GR NFV-IFA 028 V3.1.1, "Network Functions Virtualisation (NFV) Release 3; Management and Orchestration; Report on architecture options to support multiple administrative domains," Jan. 2018, 59 pages, ETSI.

ETSI GS NFV 002 V1.2.1, "Network Functions Virtualisation (NFV); Architectural Framework," Dec. 2014, 6 pages, ESTI.

ETSI GS NFV 006 V2.1.1, "Network Functions Virtualisation (NFV) Release 2; Management and Orchestration; Architectural Framework Specification," Jan. 2021, 15 pages, ETSI.

ETSI GS NFV-IFA 030 V3.4.1, "Network Functions Virtualisation (NFV) Release 3; Management and Orchestration; Multiple Administrative Domain Aspect Interfaces Specification," Jun. 2020, 23 pages, ETSI.

ETSI GS NFV-IFA 032 V3.4.1, "Network Functions Virtualisation (NFV) Release 3; Management and Orchestration; Interface and Information Model Specification for Multi-Site Connectivity Services," Jun. 2020, 101 pages, ETSI.

ETSI GR NFV-IFA 037 V0.4.0," Network Functions Virtualisation (NFV) Release 4; Architectural Framework; Report on further NFV support for 5G," May 2021, 39 pages, ETSI.

Nour Gritli et al., "Taking into Account the Management Constraints in Network Slice Design," 2021, pp. 159-164 pages, 2021 IEEE 4th 5G World Forum (5GWF), IEEE.

Balázs Németh et al., "Efficient Service Graph Embedding: A Practical Approach," 2016, 7 pages, 2016 IEEE Conference on Network Function Virtualization and Software Defined Networks (NFV-SDN), IEEE.

NGMN Alliance, "NGMN 5G P1 Requirements & Architecture Work Stream End-to-End Architecture, Description of Network Slicing Concept," Jan. 13, 2016, 7 pages, Version 1.0.

Balázs Sonkoly et al., "5G Applications From Vision to Reality: Multi-Operator Orchestration," Jul. 2020, pp. 1401-1416, IEEE Journal on Selected Areas in Communications, vol. 38, No. 7, IEEE.

Tarik Taleb et al., "On Multi-Domain Network Slicing Orchestration Architecture and Federated Resource Control," 2019, pp. 242-252, IEEE.

Nassima Toumi et al., "On cross-domain Service Function Chain orchestration: An architectural framework," 2021, Computer Networks 187, Elsevier B.V.

* cited by examiner

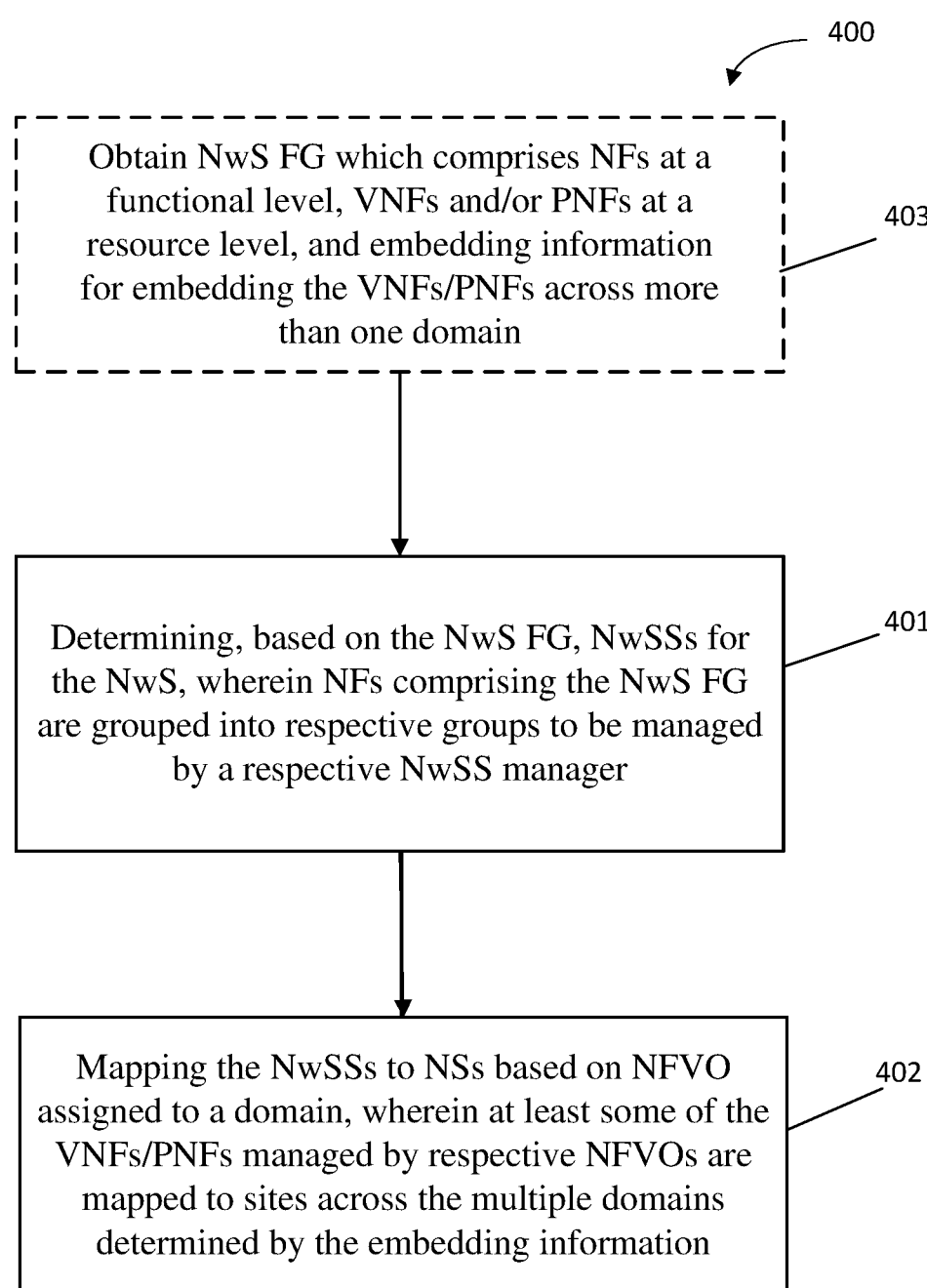

400

Obtain NwS FG which comprises NFs at a
functional level, VNFs and/or PNFs at a
resource level, and embedding information
for embedding the VNFs/PNFs across more
than one domain

403

Determining, based on the NwS FG, NwSSs for
the NwS, wherein NFs comprising the NwS FG
are grouped into respective groups to be managed
by a respective NwSS manager

401

Mapping the NwSSs to NSs based on NFVO
assigned to a domain, wherein at least some of the
VNFs/PNFs managed by respective NFVOs are
mapped to sites across the multiple domains
determined by the embedding information

APPLYING MANAGEMENT CONSTRAINTS DURING NETWORK SLICE DESIGN

CROSS-REFERENCE TO RELATED APPLICATIONS

This application is a National stage of International Application No. PCT/IB2022/054868, filed May 25, 2022, which claims the benefit of U.S. Provisional Application No. 63/193,036, filed May 25, 2021, which are all hereby incorporated by reference.

TECHNICAL FIELD

Embodiments of the disclosure relate to the field of network slicing; and more specifically, to applying management constraints during network slice design.

BACKGROUND ART

Network slicing enables network operators to create multiple end-to-end logical networks, e.g., Network Slices (NwSs), providing services of divergent Quality of Service (QoS) requirements on a shared physical infrastructure. These logical networks may span radio access, transport and core networks and may consist of one or multiple Network Slice Subnets (NwSSs). Each NwS is tailored to meet specific functional and non-functional requirements. A NwS is composed of NwSSs, which in turn are composed of Network Functions (NFs) and/or other NwSSs.

3rd Generation Partnership Project (3GPP) defines four phases for the lifecycle management of NwS instances, i.e., preparation, commissioning, operation and decommissioning. The design of a NwS is handled during the preparation phase prior to its commissioning. This phase consists of the evaluation of the NwS requirements, the creation and onboarding of the NwS Template (NwST). The NwST includes a complete description of the structure, configuration and workflows for the life cycle management of a NwS instance. The commissioning phase involves the creation of a NwS instance and the configuration of its resources. During the operation phase NwS instances can be activated, deactivated, or modified. The final phase is the decommissioning of a NwS instance, when it is first deactivated, then its resources are deallocated.

3GPP specifies three management functions related to network slices. The Communication Service Management Function (CSMF) is in charge of translating communication service-related requirements to NwS requirements as well as interacting with the Network Slice Management Function (NSMF). The main role of the NSMF is the lifecycle management of the NwS instance, and accordingly, determining the NwSSs related requirements and passing them to the Network Slice Subnet Management Function (NSSMF). The latter is responsible for the lifecycle management of NwSS instances and for communicating with the NSMF.

Network Function Virtualization (NFV) is considered as one of the enablers of network slicing as it allows for the virtualization of Network Functions (NFs) in the form of Virtual Network Functions (VNFs). A Network Service (NS) provisioned in the NFV context is composed of a set of VNFs, Physical Network Functions (PNFs) and/or other NSs (e.g., nested NSs). The European Telecommunications Standards Institute (ETSI) Industry Specification Group for NFV (ETSI ISG NFV) developed the NFV Management and Orchestration (NFV-MANO) architectural framework. The NFV-MANO allows for the management and orchestration of VNFs and NSs over an NFV Infrastructure (NFVI) and it comprises three functional blocks. The NFV Orchestrator (NFVO) is responsible for the NS lifecycle management including operations such as the onboarding of NS packages and VNF packages as well as NS instantiation. The VNF Manager (VNFM) manages the lifecycle of VNFs. The Virtualized Infrastructure Manager (VIM) is responsible for controlling and managing the resources of the NFVI.

The mapping between an information model defined for NwSs and the NFV information model presented shows that from the perspective of resource management, a NwS (respectively, NwSSs) can be deployed as one or multiple NSs. This mapping is determined during the preparation phase of the NwS. Given this mapping, an interaction between the NFV-MANO and the network slicing functions is highlighted in ETSI GR NFV-EVE 012 V3.1.1 specification. This interfacing requires that the NSMF and the NSSMF are able to determine the set of NSs and their constituent VNFs and PNFs supporting the resource requirements of a requested NwS. In addition, the NSMF and the NSSMF need to maintain an association between the NwSTs and their corresponding NS Descriptors (NSDs).

During the design phase of a NwS, its forwarding graph(s) is/are determined by selecting the appropriate network functions and their interconnections for their chaining. The NwSSs of the NwS need to be determined as well and their mapping to NSs.

There currently exist certain challenge(s). Currently the organization and capabilities of the target NFV management system(s) are considered only at the time of the NwS deployment. This means that if the mapping of a NwS to NSs and nested NSs does not match the organization and constraints of the target NFV management system(s), and they cannot be aligned on the fly, the NwS design is rendered undeployable in the target infrastructure as the NFV management system cannot instantiate and manage its needed resources as requested.

SUMMARY

Certain aspects of the disclosure and their embodiments may provide solutions to these or other challenges. An approach described in this disclosure determines the NwS, its constituent subnets and realizing NSs by taking into account the management constraints together with the placement information applicable to the NwS. Therefore, the NwS mapping to NS(s) is aligned with the organization and capabilities of management entities, e.g., management capabilities, of the target system, which guarantees its deployability.

The approach is comprised of two processes:

The first process disclosed determines the constituent NwSSs for a requested NwS; while the second process maps the requested NwS and its constituents to NSs. These NwSSs and their NSs can be given to the respective management entities to deploy the NwS. The disclosed techniques also allow for an automated NwS design process furthering the goals of zero-touch system management.

The inputs to the procedure are the Network Slice Forwarding Graph at Functional level (NwS FFG), and its mapping to resources (e.g., VNFs/PNFs), which is the Network Slice Forwarding Graph at Resource level (NwS RFG), the target network infrastructure topology and the management constraints model of its management.

First the embedding/placement information is obtained by embedding the NwS RFG in the target network infrastructure topology using an embedding routine with the assumption that the entire NwS RFG is mapped into a single network service (NS). This provides the embedding information for each VNF/PNF instance with the best placement according to the optimization goals of the embedding algorithm.

Using the embedding information of each VNF/PNF instance, the mapping between the NwS FFG and NwS RFG and the management constraints model as input, determine the network slice subnet manager NwSSManager capable of managing each Network Function (NF). Creating a network slice subnet (NwSS) from the NFs to be managed by the same NwSSManager. That is, the NFs to be managed by the same manager are grouped together. This provides the decomposition of the NwS into NwSSs.

Using the embedding information of each VNF/PNF instance, the mapping between the NwS FFG and NwS RFG, and the management constraints model, determine the NFVO which is in communication with the NwSSManager of the NF, which corresponds to the given VNF/PNF related to the NFVO being determined. Creating a NS from the VNF/PNF instances to be managed by the same NFVO, and continue the grouping of NSs until the NFVO communicating with the NwSSManager is reached. This provides the mapping of the NwSSs into one or more NS(s), which can be managed by the target NFVOs.

Finally add VNF/PNF instances, which need to be repeated in different NSs, to those NSs. The resulting NwS with its NwSSs and their mapping to one or more NS(s) is ready for deployment by the target management system.

In one aspect of the disclosed technique, a method provides at least one Network Service (NS) to a Network Slice (NwS) during a design phase of the NwS based on a NwS Forwarding Graph (NwS FG) which has Network Functions (NFs) at a functional level, Virtual Network Functions (VNFs) and/or Physical Network Functions (PNFs) at a resource level, and embedding information for embedding the VNFs and/or PNFs (VNFs/PNFs) across more than one domain. The method determining, based on the NwS FG, Network Slice Subnets (NwSSs) for the NwS, wherein NFs comprising the NwS FG are grouped into respective groups to be managed by a respective NwSS manager. The method further mapping the NwSSs to NSs based on Network Function Virtualization Orchestrator (NFVO) assigned to a domain, wherein at least some of the VNFs/PNFs managed by respective NFVOs are mapped to sites across the multiple domains determined by the embedding information.

In another aspect of the disclosed method, where the determining the NwSSs for the NwS further includes at least one leaf NwSS managed by a respective leaf NwSS manager to separate functionalities of a respective parent NwSS.

In another aspect of the disclosed method, where the separate functionalities include control plane functionality and user plane functionality.

In another aspect of the disclosed method, where the determining the NwSSs for the NwS further includes separating domain types and allowing different management constraints for the domain types.

In another aspect of the disclosed method, where the domain types include administrative type and technology type.

In another aspect of the disclosed method, where the determining further includes, for each NwSS, obtaining a list of NFVOs communicating with a respective NwSS manager for that NwSS to determine NFVOs managing multiple domains.

In another aspect of the disclosed method, where the determining further includes, for each NwSS, obtaining a list of NFVOs communicating with a respective NwSS manager for that NwSS to determine VNF and/or PNF requiring multiple instances at different sites, domains or both sites and domains.

In another aspect of the disclosed method, where the determining further includes removing VNFs/PNFs and NwSSs embedded in a domain not managed by at least one of the NFVOs.

In another aspect of the disclosed method, where the mapping further includes, for each VNF/PNF of a respective NwSS, selecting a respective NFVO managing a site embedding that VNF/PNF.

In another aspect of the disclosed method, where the mapping further includes grouping VNFs/PNFs which have a common NFVO together into an NS.

In another aspect of the disclosed method, where the mapping further includes grouping NSs which have a common NFVO into a composite NS.

In another aspect of the disclosed method, where the mapping further includes reducing NSs to a single NS.

In another aspect of the disclosed system, a node provides at least one Network Service (NS) to a Network Slice (NwS) during a design phase of the NwS based on a NwS Forwarding Graph (NwS FG) which comprises Network Functions (NFs) at a functional level, Virtual Network Functions (VNFs) and/or Physical Network Functions (PNFs) at a resource level, and embedding information for embedding the VNFs and/or PNFs (VNFs/PNFs) across more than one domain, The node is configured to determine, based on the NwS FG, Network Slice Subnets (NwSSs) for the NwS, wherein NFs comprising the NwS FG are grouped into respective groups to be managed by a respective NwSS manager. The node is further configured to map the NwSSs to NSs based on Network Function Virtualization Orchestrator (NFVO) assigned to a domain, wherein at least some of the VNFs/PNFs managed by respective NFVOs are mapped to sites across the multiple domains determined by the embedding information.

In another aspect of the disclosed system, a computer program containing instructions which, when executed on at least one processor, cause the at least one processor to carry out actions that provide at least one Network Service (NS) to a Network Slice (NwS) during a design phase of the NwS based on a NwS Forwarding Graph (NwS FG) which has Network Functions (NFs) at a functional level, Virtual Network Functions (VNFs) and/or Physical Network Functions (PNFs) at a resource level, and embedding information for embedding the VNFs and/or PNFs (VNFs/PNFs) across more than one domain. The actions include determining, based on the NwS FG, Network Slice Subnets (NwSSs) for the NwS, wherein NFs comprising the NwS FG are grouped into respective groups to be managed by a respective NwSS manager. The actions further include mapping the NwSSs to NSs based on Network Function Virtualization Orchestrator (NFVO) assigned to a domain, wherein at least some of the VNFs/PNFs managed by respective NFVOs are mapped to sites across the multiple domains determined by the embedding information.

In another aspect of the disclosed system, a computer-readable storage medium has stored thereon a computer program which provides for carrying out a method that provide at least one Network Service (NS) to a Network Slice (NwS) during a design phase of the NwS based on a NwS Forwarding Graph (NwS FG) which has Network Functions (NFs) at a functional level, Virtual Network Functions (VNFs) and/or Physical Network Functions (PNFs) at a resource level, and embedding information for embedding the VNFs and/or PNFs (VNFs/PNFs) across more than one domain. The method includes determining, based on the NwS FG, Network Slice Subnets (NwSSs) for the NwS, wherein NFs comprising the NwS FG are grouped into respective groups to be managed by a respective NwSS manager. The method further includes mapping the NwSSs to NSs based on Network Function Virtualization Orchestrator (NFVO) assigned to a domain, wherein at least some of the VNFs/PNFs managed by respective NFVOs are mapped to sites across the multiple domains determined by the embedding information.

The embodiments disclosed may provide one or more of the following technical advantage(s). The solution of the disclosure takes into consideration the organization and constraints of the management entities of the target network infrastructure at the design of a NwS, thus, ensuring that the NwS is deployable by the target system, and in particular by the management entities of the target system. The structure of the NwS is not predefined, but follows the organization of the target network(s) and their technology and administrative domains.

Further advantages are:
Gives the flexibility to describe different management architectures with different characteristics for managing NwSs, NwSSs and their resources;
At design time, considers the embedding of NwS FG, as well as management capabilities and organization at different levels; and
Allows for partitioning the constituents of a NwS into NwSSs, as well as mapping the NwS and its subnets in NSs, which can be managed according to the organization and capabilities of the target management system.

BRIEF DESCRIPTION OF THE DRAWINGS

The embodiments of the disclosure may best be understood by referring to the following description and accompanying drawings. In the drawings:

FIG. 4 shows a method of applying the Management Constraints to determine the constituent NwSSs and map NwSSs to NSs in accordance with some embodiments of the present disclosure;

DETAILED DESCRIPTION

Figure 1:
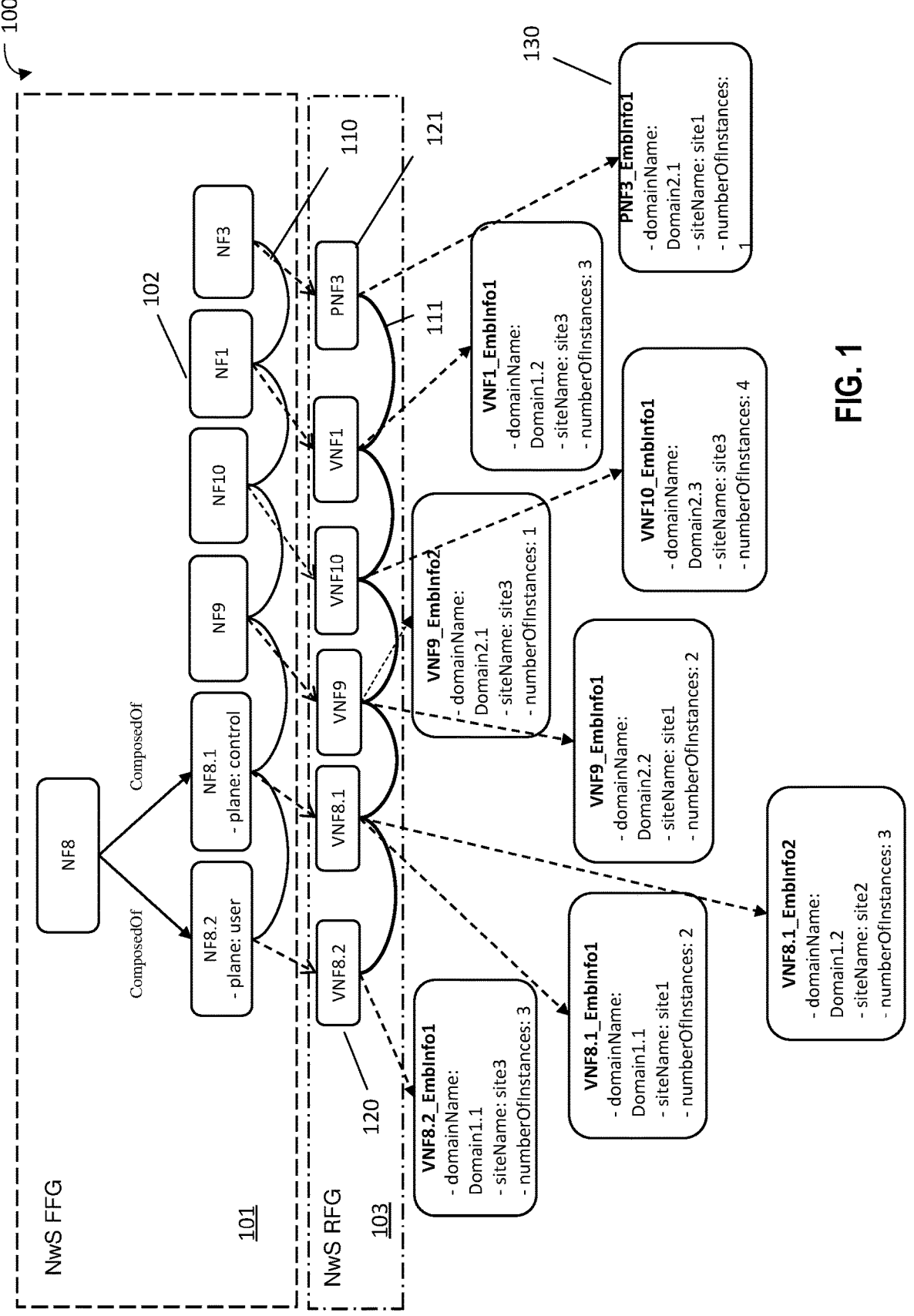
FIG. 1 shows an example of a Network Slice Forwarding Graph with placement information in accordance with some embodiments of the present disclosure.

The following description describes a methods and apparatuses for applying management constraints during network slice design. The following description describes numerous specific details such as operative steps, flow diagrams, resource implementations, network functions, types of virtual network functions, embedding information, and interrelationships of system components to provide a more thorough understanding of the present disclosure. It will be appreciated, however, by one skilled in the art that the embodiments of the present disclosure can be practiced without such specific details. In other instances, control structures, circuits, memory structures, system and/or network functions, and software instruction sequences have not been shown in detail in order not to obscure the present disclosure. Those of ordinary skill in the art, with the included descriptions, will be able to implement appropriate functionality without undue experimentation.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, model, or characteristic is described in connection with an embodiment, it is submitted that it is within the knowledge of one skilled in the art to implement such feature, structure, characteristic, or model in connection with other embodiments whether or not explicitly described.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in some embodiments of the present disclosure.

Some of the embodiments contemplated herein will now be described more fully with reference to the accompanying drawings. Embodiments are provided by way of example to convey the scope of the subject matter to those skilled in the art. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. The functions/actions described herein may occur out of the order noted in the sequence of actions or simultaneously. Furthermore, in some illustrations, some blocks, functions or actions may be optional and may or may not be executed.

In some embodiments, some or all of the functionality described herein may be provided by processing circuitry executing instructions stored in memory, which in certain embodiments may be a computer program product in the form of a non-transitory computer-readable storage medium. In some embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users of a network.

A network slice (NwS) design process aims at generating a NwS template (NwST) that meets both the functional and the non-functional requirements of a NwS expressed as part of a user's intent. A NwS may include one or more network slice subnet(s) (NwSSs), where each NwSS comprises a set of one or more network functions (NFs), either physical or virtual NFs. Therefore, the design process, on the one hand, needs to include steps that determine these NwSSs, and generate their network slice templates (NwSSTs) to reference them in the NwST. On the other hand, a NwS (respectively, NwSS) in the network function virtualization (NFV) context is realized by one or more network services (NSs). This requires further steps to define the NSs which satisfy the resource requirements of the NwS, and to generate network service descriptors (NSDs) for these NSs. The following description relates to determining NwSSs and their mapping to at least one (i.e., one or more) NS.

The NwS design starts by identifying network functions (NFs) and their interconnections needed for provisioning the NwS, and propagating to these constituents the appropriate performance requirements that meet the Quality of Service (QoS) requirements of the NwS. This information is then used to construct a NwS Forwarding Graph (FG).

Once the NwS FG has been defined, its organization into NwSSs is considered. In case the NwS needs to be divided into NwSSs, each NF constituting the NwS FG is assigned to an appropriate NwSS. A NwS may span multiple administrative and technology domains. The concept of NwSSs allows for segregating the NwS into portions to be managed by different management entities (e.g., NwSS Managers). Therefore, the definition of the NwSSs is impacted by the organization of the management system to be used to deploy and manage the NwS. Existing work on network slicing always considers under a single NwS Manager three NwSS Managers each managing a technology domain, namely, the Radio Access Network (RAN), the Transport Network (TN) and the Core Network (CN) of a communication system. That is, a single NwS Manager manages the single administrative domain of an operator with three technology domains, each with its own NwSS Manager. Considering this single option in the NwS design could be too restrictive as, for example, a NwS may need to span multiple network operators' administrative domains where the management structure may be different from one network operator to another. Network slicing also relies on principles such as control and user plane separation (e.g., CUPS). Consequently, a network operator may choose to dedicate separate per plane management. Moreover, the placement of NFs might vary from one use case to another, depending on the QoS requirements. For instance, for one use case some CN functions may be placed in a regional data center, while for another in the deep edge. Accordingly, a network operator may have custom management entities per placement option.

Taking these different possibilities into account, a method of determining the NwSSs needs to be more granular and customizable than simply defining a NwSS for each technology domain of the network. Allowing different management constraints per administrative and/or technology domain will allow for custom design solutions. The definition of NwSS needs to reflect these constraints of the different domains of the NwS management system, which is going to deploy the NwS. In addition, the NF placement and the management constraints can be considered together at design time.

When mapping the NwSS to at least one NS, the characteristics of the underlying NFV management system(s)

should be considered as well. A selection of an appropriate deployment location may be constrained by the management capabilities of the respective NFV Orchestrator(s) (NFVO(s)), e.g., single-domain, multi-domain. The NFV management and orchestration (MANO) reference architecture was initially designed to support the management within a single administrative domain. The European Telecommunications Standards Institute (ETSI) NFV addressed evaluating different architectural options for supporting the NFV MANO management operations within an administrative domain consisting of multiple technological domains as well as across multiple administrative domains. Among the architectural options is a hierarchical multi-domain orchestration architecture. This architecture comprises a top-level NFVO, called the umbrella NFVO, which communicates with the NFVO of each administrative domain.

Given the aforementioned architectures, an NFVO may be part of a hierarchy of NFVOs and may not always have multi-domain or multi-site capabilities. Consequently, it may or may not be capable of deploying a NS realizing a NwS. Currently, selecting the NFVO responsible for deploying an NS is part of the NwS instantiation process, at which time the different placement options of nested NSs and VNFs are evaluated. In this respect, the NS instance realizing a NwS, has to meet the non-functional requirements of the NwS, such as the end-to-end latency, isolation and bandwidth. The constituents of the NS should be placed in such a way that these requirements can be satisfied. The NFVO usually decides on the location of these constituents using placement algorithms. In this process some of the placement options may be eliminated because they violate the required management capabilities, even though they may be among the best choices for meeting the non-functional requirements. Therefore, mapping a NwS to NS(s) without considering the organization and capabilities of the target management system where the NS(s) will be placed together with the non-functional requirements, may result in designing NSDs undeployable by the given management system.

Consequently, knowledge about the management constraints and the desired placements early on at the design stage would allow for designing NS(s) which can be managed by the target NFVO(s) and meet the non-functional requirements of the NwS. While there has been a lot of work related to the embedding of the FGs in the NFV context, they have been used at runtime only for a given (an already defined) mapping of the NwS to NSs. Such embedding was not considered at design time even though the management capabilities at the desired placement impact the NwS mapping to NS(s). This disclosure describes an approach to apply NwS FG embedding algorithms at the design phase, considering the target physical network infrastructure as a single network and an initial mapping of the NwS to a simple NS comprising only virtual network functions and/or physical network functions (VNFs/PNFs). The described technique can provide the embedding information for the most desirable placement of the VNFs/PNFs of the NwS. Thereafter, the mapping of NwSSs to NSs can be performed according to the management constraints of the management system of the domains where the VNFs/PNFs are placed (e.g., embedded). Thus, the NwSSs can be determined based on this information resulting in the reorganization of VNFs/PNFs into nested NSs as needed according to the management constraints. Furthermore, the term VNF/PNF mentioned herein is defined as VNF, PNF, or both VNF and PNF (e.g., VNF and/or PNF).

Network Slice Forwarding Graph and Embedding Information

FIG. 1 shows an example of a Network Slice Forwarding Graph (NwS FG) with placement information in accordance with some embodiments of the present disclosure. FIG. 1 shows an example of a NwS FG at the function and at the resource levels along with the embedding information of the NwS RFG constituents. At a certain stage of the NwS design process, a NwS FG 100 is defined. A NwS FG at the functional level (NwS FFG) 101 comprises a set of NFs 102 along with the information of their interconnections 110. At a resource level this NwS FG (NwS RFG) 103 comprises a set of VNF(s) 120 and/or PNF(s) 121 interconnected using virtual links 111. Each NF of the requested NwS is realized by one or multiple VNFs/PNFs 120/121 in the NwS RFG 103. Elements of the NwS RFG 103 may be tailored to meet certain QoS requirements of the NwS, such as throughput, number of users, etc. For this purpose, the number of instances needed is determined for each constituent VNFs/ PNFs as well as their placement constraints in terms of affinity and anti-affinity. Other QoS requirements (e.g., end-to-end latency, bandwidth) can be addressed later on during the placement, also referred to as embedding of the NwS RFG 103 onto the network operators' infrastructure.

Once the elements of the NwS RFG 103 have been tailored, the design process can continue with determining the NwSSs. In the disclosed approach, the definition of NwSSs relies on the organization and constraints of the management entities available at the placement of the different constituents of the NwS RFG 103. Given that the constituents may be placed in different administrative and/or technology domains and that the organization of management entities and their capabilities may vary from one domain to another, it may not be possible to determine the appropriate NwSSs without the placement information of the different constituents of the NwS RFG 103. In other words, determining the NwSSs without considering the placement information may lead to an NwS design that cannot be supported by the targeted domains. Therefore, the placement information of the NwS RFG 103 can be considered early in the design phase to be able to determine the NwSSs that can be supported and managed by the operator's management system(s).

To obtain the placement information for the NwS RFG 103, a design-time embedding of the NwS RFG 103 is performed. The embedding routine takes as an input, the tailored NwS RFG of the simple NS of the initial mapping of the NwS, a set of non-functional requirements, such as end-to-end QoS requirements of the NwS, and the affinity and anti-affinity constraints. It also takes the information about the physical infrastructure including information about the different sites, their interconnections, their supported VNFs/PNFs, as well as their capacities. As a result of the embedding routine, embedding information 130 is generated for each VNF/PNF 120/121 of the NwS RFG 103, which indicates the domain name, the site name and the number of VNF/PNF instances placed at the site. Thus, the embedding routine takes into account that for a given VNF/PNF of the NwS RFG multiple instances may be required. In some cases, the instances may not be placed at the same site/domain due to anti-affinity constraints such as geo-redundancy, etc. In such case, the VNF/PNF of the NwS RFG 103 can have multiple embedding information elements, each one specifying a domain and a site for a subset of instances.

The NwS FG at the functional and at the resource levels along with the embedding information generated at design time, as shown in FIG. 1, represent the starting point to the mapping of the NwS to at least one NS. It is to be noted that in some embodiments, known routines and algorithms for generating the NwS FG 100 can be adapted for the starting point to the mapping of the NwS to NSs.

Description of the Management Constraints

As discussed earlier, the organization and the management capabilities may be different per technology domain as well as per administrative domain. Therefore, taking into consideration the management constraints earlier at design time is essential for the design of NwSSs and NSs, so that they can be deployed and managed properly in the target infrastructure.

Figure 2:
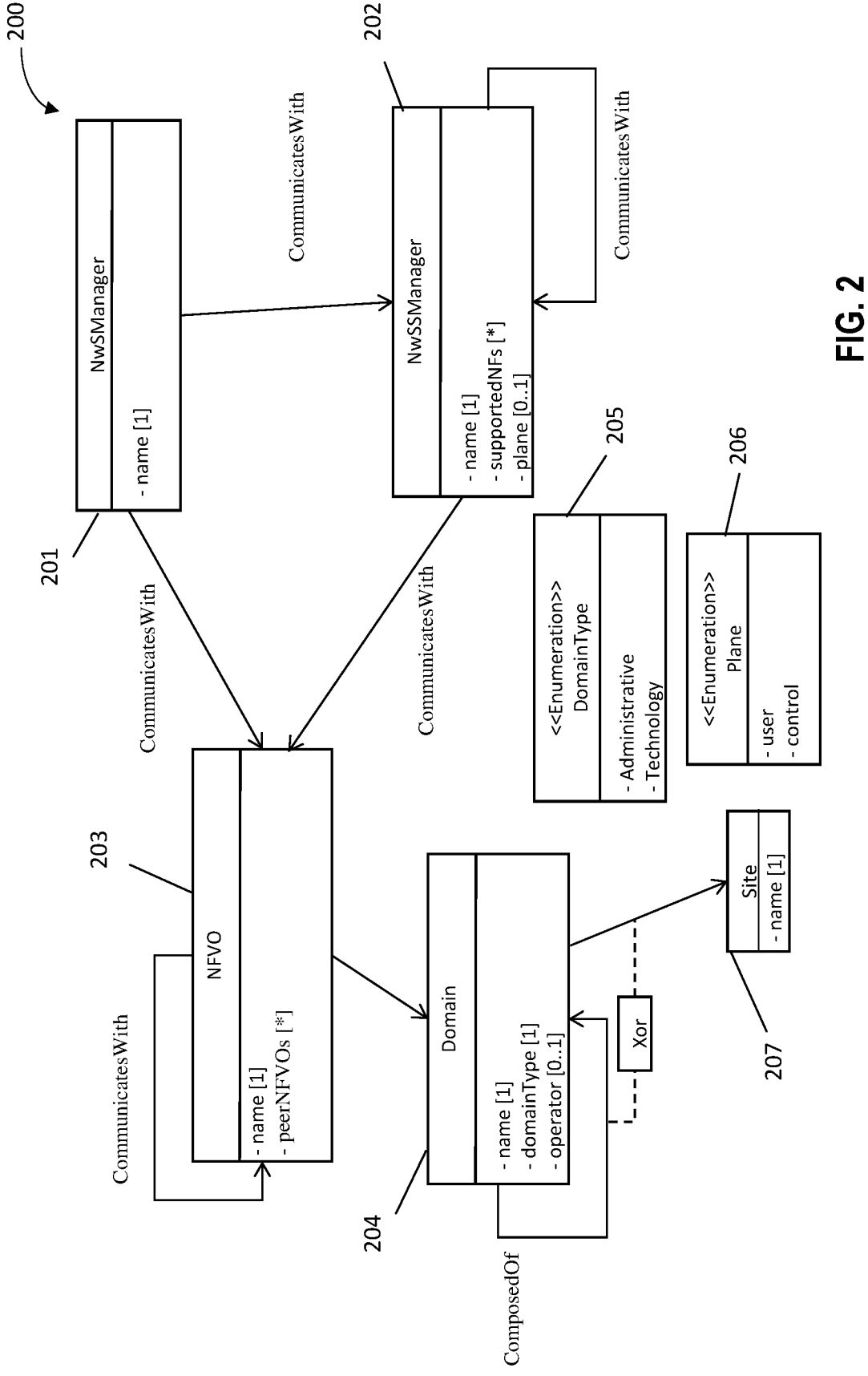
FIG. 2 shows a Management Constraints Metamodel in accordance with some embodiments of the present disclosure.

FIG. 2 shows a Management Constraints Metamodel in accordance with some embodiments of the present disclosure. FIG. 2 shows a management constraints metamodel 200 of the disclosure. The management constraints metamodel 200 allows the high-level description of management entities, their capabilities, as well as their organization through their relations to other management entities and to the technology and administrative domains. The management constraints metamodel captures different management levels: the NwS management or manager 201, the NwSS management or manager 202 and the resource-level management or manager 203, shown as a NFVO.

The management constraints metamodel 200 allows for describing different organizations of management entities. Such a model is not restricted to having one management entity per administrative/technology domain nor does it limit the number or organization of management entities. The NwSManager 201 element represents the entity that manages end-to-end NwSs spanning one or multiple administrative/technology domains. An instance of the NwSManager may have a communication relation with multiple instances of the NwSSManager 202 element which are responsible for managing NwSSs. This relation is expressed using a CommunicatesWith association.

A NwSSManager 202 may have communication relations with other NwSSManagers with more granular management capabilities. The management constraints metamodel 200 allows for describing subtrees of NwSSManagers, in which the NwSSManager communicating directly with the NwSManager is at the root of the subtree. At least each leaf NwSSManager of a subtree specifies a list of network functions it is capable of managing using the supportedNFs attribute. Additionally, in its plane attribute, a NwSSManager may specify if it is responsible for managing NFs of a specific plane 206, e.g., user or control plane. Note that with the management constraints metamodel 200, there may be more than one NwSSManager 202 and more than one NFVO element 203.

In the disclosure, a NwSS managed by a leaf NwSSManager is referred to as a simple NwSS as it consists of NFs only (i.e., it contains no other nested NwSS). All these NFs are listed as supported NFs by the NwSSManager. In contrast, a NwSS managed by a non-leaf NwSSManager is called a composite NwSS as it contains one or more nested NwSSs and possibly some NFs. Each nested NwSS is managed by a child or peer NwSSManager. In turn a nested NwSS can be a simple NwSS or a composite NwSS.

Since a NwS (respectively, NwSS) is mapped to one or multiple NSs at the resource level, a NwSManager 201 (respectively, NwSSManager 202) may have a communication relationship with multiple instances of the NFVO element 203. An NFVO may manage NSs across one or multiple domains 204. An instance of the domain element (i.e., a domain) 204 can be characterized as a technology domain or an administrative domain using the domainType attribute 205. A domain 204 may be composed of other domains or of sites 207. A technology domain may comprise technology domains or sites, but not administrative domains. Information about the network operator could be specified when an instance of the domain element represents an administrative domain.

A NFVO associated with multiple sites, is a multi-site NFVO and it is capable of managing NS(s) with constituents deployed on different sites. In case an NFVO is associated with one site only, it is a single-site NFVO providing NS management on that site only. An NFVO associated with multiple domains (i.e., technology or administrative) is a multi-domain NFVO and it is capable of managing NS(s) with constituents deployed in multiple domains.

Figure 3:
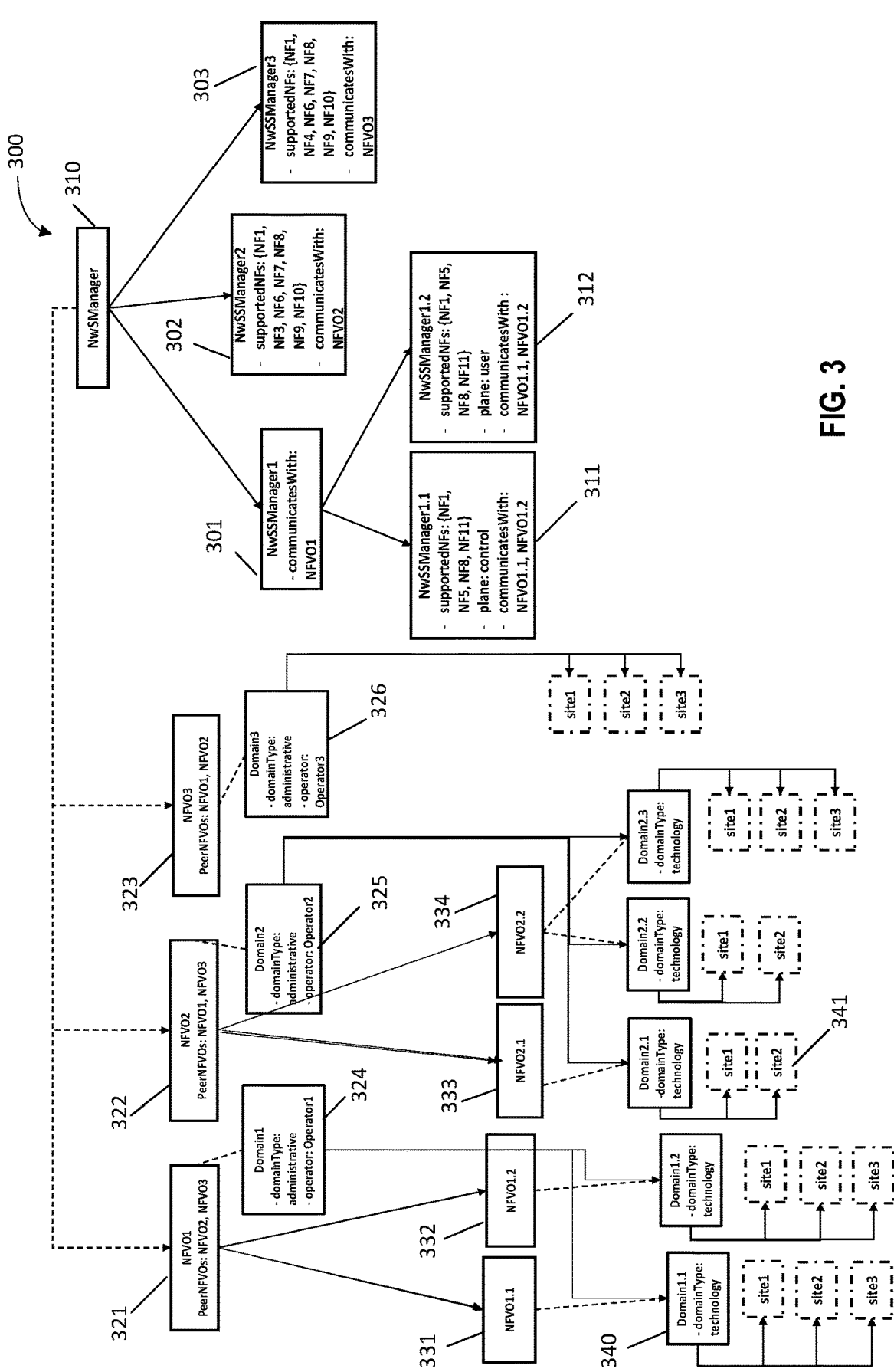
FIG. 3 shows an example Management Constraints Model in accordance with some embodiments of the present disclosure.

The management constraints metamodel 200 also allows for describing trees of NFVOs where there is communication relation between a parent NFVOs and its child NFVOs. Each tree of NFVOs describes a hierarchy of resource management within one or multiple domains. For instance, an NFVO responsible for NS management in an administrative domain can communicate with NFVOs managing NSs within the different technology domains of that administrative domain. FIG. 3 shows examples of parent and child NFVOs.

A NwS can be deployed in multiple domains belonging to different operators. The management constraints metamodel 200 allows for defining a common root NFVO which is responsible for cross-domain management. Alternatively, multiple root NFVOs could be specified as peer NFVOs using the peerNFVOs attribute. The peer relation allows for communication between NFVOs in order to manage NSs across multiple domains, but without implying a hierarchical relation between those NFVOs. An NFVO element referencing another NFVO element as a peer, is a multi-domain NFVO that has the capability to manage NSs in the peer NFVO domains. The peer NFVO relation may be indicated only between root NFVOs.

FIG. 3 shows an example Management Constraints Model in accordance with some embodiments of the present disclosure. FIG. 3 shows an example instance 300 of the management constraints metamodel 200. In this example, the NwSliceManager 310 communicates with three NwSS-Managers. "NwSSManger1" 301 communicates with two other subnet managers, where "NwSSManger1.1" 311 is capable of managing the set of NFs: NF1, NF5, NF11, NF8 as part of the control plane, while "NwSSManger1.2" 312 is capable of managing the same NFs as part of the user plane. "NwSSManger2" 302 and "NwSSManger3" 303 each has its own supported sets of NFs specified.

On the left hand side of the FIG. 3, three trees of NFVOs are specified. NFVO1 321, NFVO2 322 and NFVO3 323 are root NFVOs each managing one administrative, i.e., "Domain1" 324, "Domain2" 325 and "Domain3" 326, respectively. These NFVOs are peer NFVOs allowing the management of NS(s) deployed across the three domains. Both "Domain1" and "Domain2" are composed of multiple technology domains 340. Each technology domain comprises sites 341. "Domain3" consists of sites directly. "NFVO1" can communicate with two other NFVOs, "NFVO1.1" 331 and "NFVO1.2" 332, each responsible for managing a technology domain within the administrative domain "Domain1". Similarly, "NFVO2" also communicates with two child NFVOs "NFVO2.1" 333 and "NFVO2.2" 334, however, they are responsible for three technology domains in total as "NFVO2.2" manages both "Domain2.2" and "Domain2.3".

Note that besides their parent NFVO, the child NFVOs "NFVO1.1" and "NFVO1.2" are also in direct communication relation with "NwSSManager1.1" 311 and "NwSSManager1.2" 312. For clarity the relations are shown as CommunicatesWith attributes of the NwSSManagers.

FIG. 4 shows a method of applying the Management Constraints to determine the constituent NwSSs and map NwSSs to NSs in accordance with some embodiments of the present disclosure. FIG. 4 shows a method 400 of providing at least one NS to a NwS during a design phase of the NwS based on a NwS FG which has NFs at a functional level, VNFs and/or PNFs at a resource level, and embedding information for embedding the VNFs/PNFs across more than one domain.

At operative step 401, the method 400 determines, based on the NwS FG, NwSSs for the NwS, wherein NFs comprising the NwS FG are grouped into respective groups to be managed by a respective NwSS manager. Some example processes to perform the action of operative step 401 are:

where the determining the NwSSs for the NwS further includes at least one leaf NwSS managed by a respective leaf NwSS manager to separate functionalities of a respective parent NwSS;

where the separate functionalities include control plane functionality and user plane functionality;

where the determining the NwSS for the NwS further includes separating domain types and allowing different management constraints for the domain types;

where the domain types include administrative type and technology type;

where the determining further includes, for each NwSS, obtaining a list of NFVOs communicating with a respective NwSS manager for that NwSS to determine NFVOs managing multiple domains;

where the determining further includes, for each NwSS, obtaining a list of NFVOs communicating with a respective NwSS manager for that NwSS to determine VNF and/or PNF requiring multiple instances at different sites, domains or both sites and domains; and where the determining further comprises removing VNFs/ PNFs and NwSSs embedded in a domain not managed by at least one of the NFVOs are discarded.

The description above are examples and some embodiments will have other combinations. Furthermore, a more detailed embodiment for performing the operative step 401 is described in reference to FIG. 5.

At operative step 402, the method 400 maps the NwSSs to NSs based on NFVO assigned to a domain, wherein at least some of the VNFs/PNFs managed by respective NFVOs are mapped to sites across the multiple domains determined by the embedding information.

Some processes to perform the action of operative step 402 are:

where the mapping further includes, for each VNF/PNF of a respective NwSS, selecting a respective NFVO managing a site embedding that VNF/PNF;

where the mapping further includes grouping VNFs/PNFs which have a common NFVO together into an NS;

where the mapping further comprises grouping NSs which have a common NFVO into a composite NS; and where the mapping further comprises reducing NSs to a single NS.

The description above are examples and some embodiments will have other combinations. Furthermore, a more detailed embodiment for performing the operative step 402 is described in reference to FIG. 6.

The method 400 can include an optional operative step 403. Note that in order to perform operative steps 401 and 402, a NwS FG is needed. The NwS FG earlier described can be generated as part of method 400 (at step 403) or can be obtained (at step 403) from other sources for use by operative steps 401 and 402.

Determining the Constituent Network Slice Subnets

Figure 5:
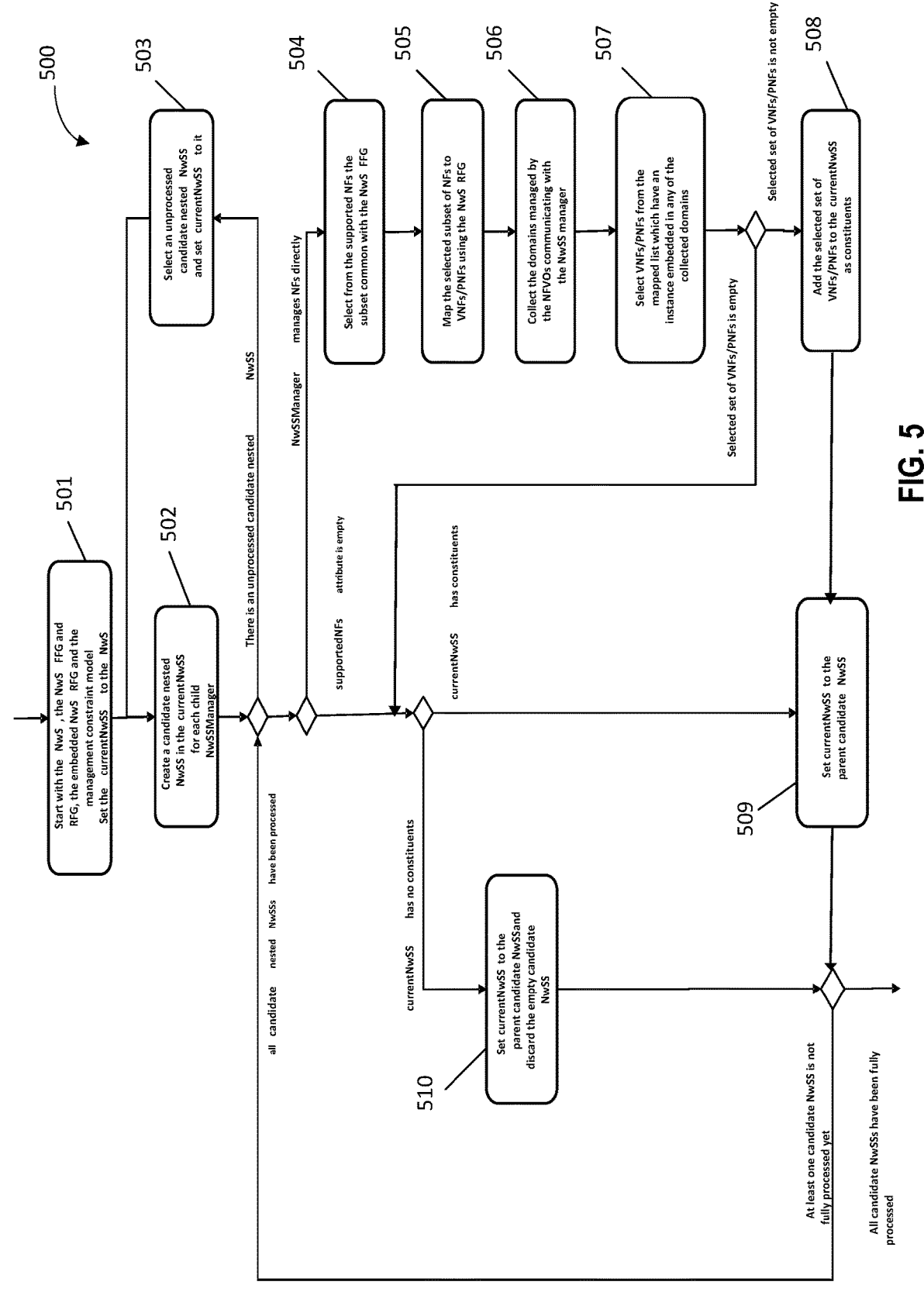
FIG. 5 shows a flowchart for determining the constituent NwSS(s) in accordance with some embodiments of the present disclosure.

FIG. 5 shows a flowchart for determining the constituent NwSS(s) in accordance with some embodiments of the present disclosure. FIG. 5 shows a flowchart for a process 500 to determine constituent NwSS for a NwS. In some embodiments, process 500 corresponds to operative step 401 of method 400 of FIG. 4.

The process (e.g., method or routine) 500 is better understood when described using the example embodiments shown in FIG. 1 and FIG. 3. FIG. 5 uses the NwS FG embedding routine (e.g., FIG. 1) during the design phase so that its results can be used together with the management constraints model (e.g., FIG. 3) to organize the constituents of the embedded NwS into NwSSs according to the management constraints to ensure deployability.

The process 500 is a depth first traversal of the management constraints model. First, the candidate NwSSs with their constituents, e.g., VNFs/PNFs and/or nested NwSSs, are determined based on the NwSSManagers of the management constraints model (e.g., FIG. 3) and the NwS FG (e.g., FIG. 1) at operative step 501. When a leaf is reached and on the backtracking path, each candidate NwSS is evaluated against the NFVOs appropriate to the embedding information of its constituents to determine if a constituent or the NwSS should be eliminated.

Each NwSSManager manages a NwSS for the NwS being designed. Accordingly, a candidate NwSS is created for each NwSSManager in the management constraints model at operative step 502. This is done for all candidate nested NwSS(s) (operative step 503). For example, starting with creating a candidate NwSS for the root NwSSManager of each subtree and continuing the creation of candidate nested NwSSs for each of the NwSSManager's children. Then, continue with the children's children and so on until the leaves are reached. The NwSS to which the candidate nested NwSSs are added for each child NwSSManager becomes a composite NwSS. The NwSS created for a leaf NwSSManager remains a simple NwSS.

When a leaf NwSSManager is reached the constituents of candidate NwSS (i.e., simple NwSS) are determined based on its supported NFs and the NwS FG (operative step 504). Namely, constituents are considered for each NF in the NwS FFG 101 which is also listed as supported NF for the NwSSManager. The NFs of the common subset are mapped to VNFs/PNFs 120/121 according to the NwS RFG 103 and considered as candidate constituents (operative step 505). The same evaluation is performed also for non-leaf NwSSManagers that are capable of managing NFs directly.

An NF of the NwS FFG 101 may correspond to one or more VNF/PNF 120/121 in the NwS RFG 103. That is, a NF listed in the supportedNFs attribute may be high-level NF with no direct implementation. In such a case, all the VNFs/PNFs realizing together the NF are considered as constituents of the candidate NwSS. In case, a NwSSManager manages a specific plane, only the functionalities belonging to the supported plane are considered. If the supportedNFs attribute of a leaf NwSSManager does not contain any functionality required in the NwS FG, the corresponding candidate NwSS is eliminated. When all constituents of a candidate NwSSs were eliminated, the candidate composite NwSS is eliminated as well.

Considering an example which takes as input the NwS FG shown in FIG. 1 and the management constraints model shown in FIG. 3. The "NwSManager" 310 communicates directly with three NwSSManagers 301-303. Consequently, three candidate nested NwSSs are considered:

NwSS1: to be managed by "NwSSManager1"
NwSS2: to be managed by "NwSSManager2"
NwSS3: to be managed by "NwSSManager3"

In the management constraints model of FIG. 3 the "NwSSManager1" is a root NwSSManager communicating with two leaf NwSSManagers. Hence, two candidate nested NwSSs are created, i.e., "NwSS1.1" and "NwSS1.2" to be managed respectively by "NwSSManager1.1" 311 and "NwSSManager1.2" 312, and added to candidate "NwSS1" which becomes a composite NwSS.

"NwSSManager1.1" is capable of managing "NF1", "NF5", "NF8" and "NF11" of the control plane. According to FIG. 1, the NwS FFG includes from the list only "NF1" and "NF8". In addition, "NF8" is composed of "NF8.1" and "NF8.2", where "NF8.1" is a control plane functionality, while "NF8.2" is a user plane functionality. Therefore, only "NF8.1" will be selected, since "NF8.1" is a control plane functionality, in addition to "NF1". At the resource level "NF1" maps to "VNF1", and "NF8.1" to "VNF8.1". Accordingly, they are considered as candidate constituents of "NwSS1.1". Similarly, the candidate constituents of "NwSS1.2", "NwSS2" and "NwSS3" are determined as follows:

NwSS1.2: VNF8.2 and VNF1.
NwSS2: VNF8.1, VNF8.2, VNF9, VNF10, VNF1 and PNF3.
NwSS3: VNF8.1, VNF8.2, VNF9, VNF10 and VNF1.

Once the candidate NwSSs and their constituents have been determined, they are checked against the embedding domains (operative step 506). For each candidate NwSS, the list of NFVOs communicating with the NwSSManager of the candidate NwSS is collected with all the domains they can manage (operative step 506). On the one hand, an NFVO may be responsible for managing several domains. On the other hand, each candidate VNF or PNF of the candidate NwSS may require multiple instances embedded at different site/domains resulting in more than one piece of embedding information each of which includes the siteName and the domainName. At operative step 507, VNFs/PNFs from mapped list which have an instance embedded in any of the collected domains are selected.

The candidate constituents embedded in domains none of which is managed by any of the NFVOs are removed from the candidate constituent list. A candidate NwSS that has all its constituents (i.e., VNFs/PNFs and nested NwSS) removed, is also discarded. Only the remaining candidate NwSS with their remaining constituents are considered for mapping them to NSs (operative step 508).

In the example, none of the VNFs/PNFs of the NwS RFG are embedded in "Domain3". Hence, candidate "NwSS3" will be discarded. "NwSS1.1" communicates with both "NFVO1.1" and "NFVO1.2". Both, the embedding information of "VNF8.1" and "VNF1" are in the domains managed by "NFVO1.1" and "NFVO1.2". Therefore, these VNFs remain as constituents of "NwSS1.1". The same process is applied for the other NwSSs which results in:

NwSS1 consisting of NwSS1.1 and NwSS1.2
NwSS1.1 consisting of VNF8.1 and VNF1.
NwSS1.2 consisting of VNF8.2 and VNF1.
NwSS2 consisting of VNF9, VNF10, PNF3.

Operative steps 509 and 510 set the current NwSS to the parent candidate NwSS, where operative step 510 discards the empty candidate NwSS when the NwSS has no constituents. In the above example, NwSS1 and NwSS2 remain as the two parent NwSSs. NwSS3 is discarded.

Mapping of a Network Slice and its Constituents to at Least One NS

Figure 6:
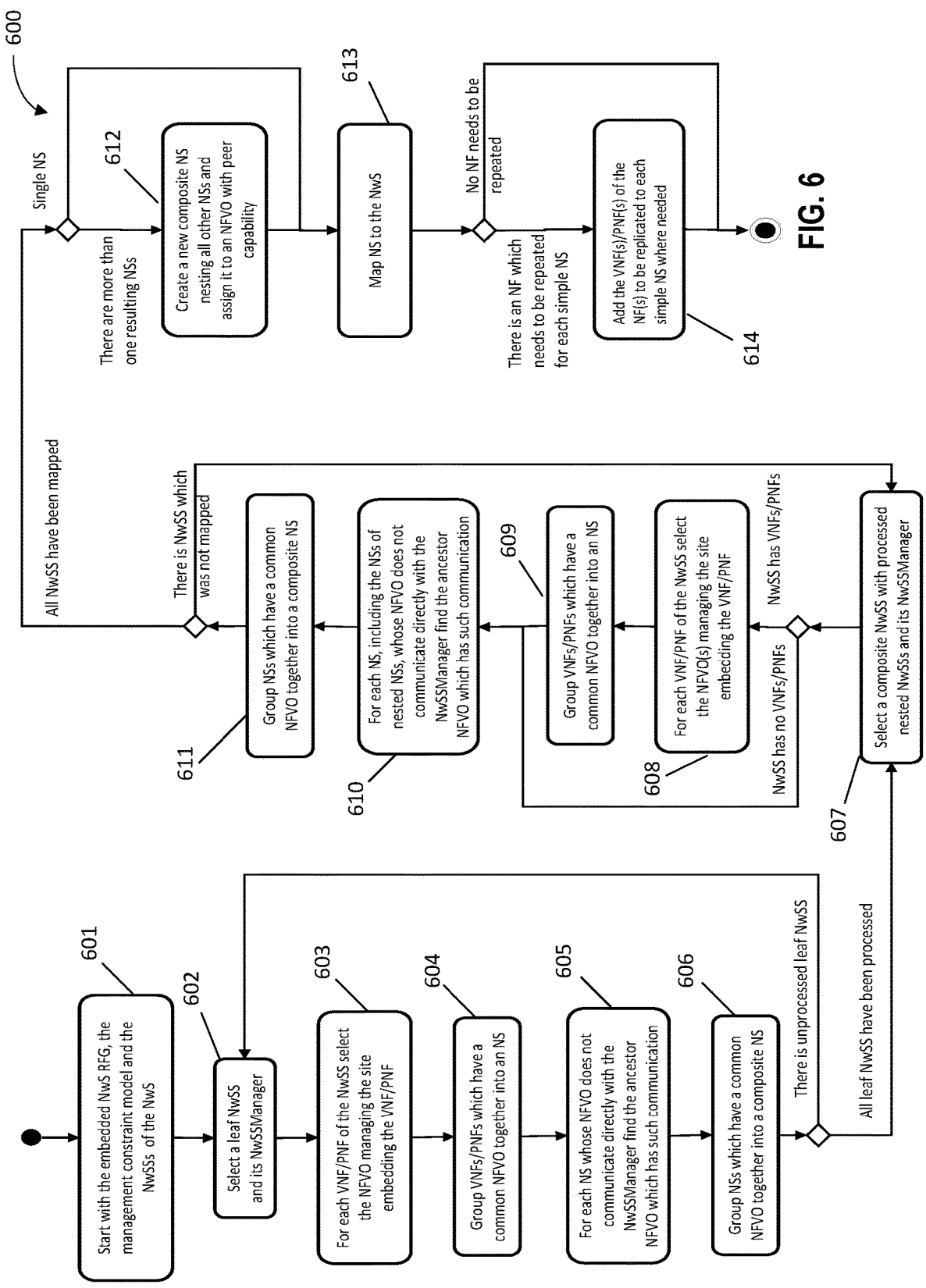
FIG. 6 shows a flowchart for mapping NwSSs to NSs in accordance with some embodiments of the present disclosure.

FIG. 6 shows a flowchart for mapping NwSSs to NSs in accordance with some embodiments of the present disclosure. FIG. 6 shows a flowchart for a process (method or routine) 600 for mapping of a simple NwSS to at least one NS, then for a composite NwSS to at least one NS. The process (e.g., method or routine) 600 is better understood when described using the example embodiments shown in FIG. 1 and FIG. 3. At this point of the design process, the NwSSs and their constituents have been determined, such as from the process 500 described above (operative step 601). In the NFV context, these NwSSs and their NwS are realized by NS(s) which need(s) to be described by NSDs for deployment. Therefore, the following design process involves mapping the NwS and its constituents to at least one NS. Since different architectures may be used for NS management, a one-to-one mapping from a NwS or NwSS to a NS may not always result in a NS manageable by the target NFVO. Hence, the process takes into account the organization and capabilities of the NFVOs where the NwS constituents are embedded.

Each NwSS determined by the first method is mapped to at least one NS according to the organization and the capabilities of the NFVOs described in the management constraints model and associated with the domains the NwSS is embedded. This mapping may result in one NS or multiple NSs. A resulting NS may have VNFs and PNFs, such as a simple NS, or it may include nested NSs resulting in a composite NS.

A. Mapping of Simple NwSSs to NS(s)

First the procedure of mapping a simple NwSS into at least one NS is described. In this case the NwSS consists of VNFs and/or PNFs only (operative step 602). The process identifies the NFVOs managing the placement sites and domains of the NwSS constituents (e.g., VNFs/PNFs) (operative step 603). To select a NFVO, it should have a direct or indirect (e.g., the NFVO is an offspring of a NFVO with direct) communication relation with the NwSSManager of the NwSS. Thereafter, the NwSS constituent VNFs/PNFs having common selected NFVO(s) are grouped together (operative step 604). As a result of this grouping, multiple groups could be generated. Each group includes VNFs and PNFs that could be managed together as one NS. Therefore, a NS is created for each group and the VNFs/PNFs are assigned to it. [00%] If the NFVO of a group, that is of an NS, has no direct communication with the NwSSManager of the NwSS being processed, one of its ancestors in the tree of NFVOs is selected with such direct communication (operative step 605). Once all NSs have a directly communicating NFVOs, the NSs that have the same NFVO selected are grouped together into a new composite NS (operative step 606). It is possible that a single root NFVO is reached for all the NSs, which communicates directly with the NwSSManager. Hence, all NSs will be assigned to a new NS to be managed by the root NFVO and the NwSS is mapped to this NS. It is also possible that multiple different root NFVOs are reached for different sets of NSs. In this case, the peer relations of these root NFVOs are checked. If they are peers, then a new composite NSs is created from the NS of each root NFVO, which then can be managed by any of the peer NFVOs. In case the root NFVOs are not peers, this means that they cannot interact to manage NSs across domains. In other words, these domains are disjoint (disconnected).

Since the embedding routine takes into consideration the interconnection of different sites, this implies that the VNFs/PNFs embedded on different domains do not require interconnection. With respect to mapping the NwSS to NSs this means that no further action is needed (i.e., the NwSS is mapped to multiple NSs).

In the shown example, "NwSS2" is a simple NwSS, consisting of "VNF9", "VNF10", and "PNF3". According to the management constraints model and the embedding information, two groups are created accordingly:

NwSS2_group1: (manager: NFVO2.1, constituents: VNF9, PNF3), based on VNF9_EmbInfo2 and PNF3_EmbInfo1

NwSS2_group2: (manager: NFVO2.2, constituents: VNF9, VNF10), based on VNF9_EmbInfo1 and VNF10_EmbInfo1

"NwSS2_group2" comprises constituents embedded in two different technology domains: "Domain2.2" and "Domain2.3". Since "NFVO2.2" is capable of managing both domains, "NwSS2.group2" is mapped to a simple NS.

For "NwSS2_group1", "VNF9" and "PNF3" are embedded in the same technology domain, but not on the same site. "NFVO2.1" have multi-site management capabilities (as it is associated with multiple sites), thus "NwSS2_group1" can also be mapped to a simple NS comprising of "VNF9" and "PNF3". Therefore, the mapping result of the groups is as follows:

Sub2_group1: {manager: NFVO2.1, NSlist: {NS2.1 (VNF9, PNF3)}}

Sub2_group2: (manager: NFVO2.2, NSlist: {NS2.2 (VNF9, VNF10)}

In the example, neither "NFVO2.1" nor "NFVO2.2" has a direct communication to "NwSSManager2", the manager of "NwSS2", but they have a common parent NFVO, i.e., "NFVO2". Therefore "NS2.1", created from "NwSS2_group1", and "NS2.2", created from "NwSS2_group2", are grouped together as follows:

NwSS2_group: {manager: NFVO2, Nslist: NS2{{NS2.1 (VNF9, PNF3), NS2.2(VNF9, VNF10)}}}.

Since "NFVO2" manages multiple technology domains according to the management constraints model, it has its multi-domain management capabilities enabled. It also has a direct communication relationship with "NwSSManager2" therefore no further processing is needed.

B. Mapping of a Composite NwSS to NS(s)

A NwSS nesting other NwSSs can be processed once all its nested NwSSs have been processed (operative step 607). The process starts by processing the VNF/PNF constituents of NwSS in a similar manner as for the simple NwSS (operative step 608). The NFVOs are identified for all VNFs/PNFs and those managed by the same NFVO are grouped together into a NS (operative step 609). Once all VNFs/PNFs are grouped into NSs they are processed together with the NSs of the nested NwSSs. As in the case of simple NwSS, for NSs whose NFVOs do not communicate directly with the NwSSManager, an ancestor NFVO is selected with direct communication (operative step 610). Again, NSs which are managed by the same NFVO are grouped into a composite NS (operative step 611). The process continues the same way as described for the simple NwSSs.

It is noteworthy to mention, that NSs to be managed by NFVOs with direct communication to the respective NwSSManager can be mapped to the NwSSs of these NwSSManagers and deployed by them. However, further grouping into composite NSs may be beneficial as in this case the managing NFVO can take care of all resource related aspects of the deployment including interconnectivity of the NSs. Thus, the grouping continues according to the hierarchy of the NFVOs until the root NFVO(s) is(are) reached.

A NwS can be mapped into its realizing NS(s), once all of its constituents NwSSs are mapped. This mapping is done according to the NFVO(s) with a direct communication relation with the NwSManager.

For instance, "NwSS1" is a composite NwSS, hence the process starts by mapping its constituent subnets, namely "NwSS1.1" and "NwSS1.2". Both "NwSS1.1" and "NwSS1.2" are simple NwSS for which the procedure of mapping simple NwSSs is used.

For "NwSS1.1" two groups are created based on the NFVOs managing the domains embedding the instances of "VNF8.1" and "VNF1":

NwSS1.1_group1: (manager: NFVO1.1, constituents: VNF8.1), based on VNF8.1_EmbInfo1

NwSS1.1_group2: {manager: NFVO1.2, constituents: VNF8.1, VNF1}, based on VNF8.1_EmbInfo2 and VNF1_EmbInfo1

To manage "VNF8.1" by "NFVO1.1" "NwSS1.1_group1" is mapped to a simple NS, i.e., "NS1.1.1(VNF8.1)". To manage "VNF8.1" and "VNF1" at different sites "NFVO1.2" has multi-site management capabilities. Hence, "NwSS1.1.group2" can also be mapped to a simple NS, i.e., "NS1.1.2(VNF8.1, VNF1)". The same process applied to "NwSS1.2" results in its mapping to one simple NS, namely, "NS1.2(VNF8.2, VNF1)" to be managed by "NFVO1.1" as well. Both, "NFVO1.1" and "NFVO1.2" have a direct communication relation with the managers of "NwSS1.1" and "NwSS1.2". That is, their mapping already makes "NwSS1" deployable by "NwSSManager1.1" and "NwSSManager1.2".

However, by continuing the bottom-up traversal further mapping may be determined. Indeed, "NFVO1" allows for multi-domain management and is a parent NFVO for "NFVO1.1" and "NFVO1.2". It also has a direct communication relation with "NwSSManager1", the manager of "NwSS1". Thus, the NSs realizing "NwSS1.1" and "NwSS1.2" can be grouped together to "NS1" to be managed by "NFVO1" and mapped to "NwSS1". This will allow "NwSSManager1" to deploy "NwSS1" directly with "NFVO1", which then would handle all resource issues, e.g., connectivity, between "NS1.1" and "NS1.2" (operative step 613).

Therefore, one group is created with these mapping results as follows:

NwSS1_group: {manager: NFVO1, Nslist: NS1{NS1.1{NS1.1.1(VNF8.1), NS1.1.2(VNF8.1, VNF1)}, NS1.2(VNF8.2)}}.

After mapping both "NwSS1" and "NwSS2" to NSs, the root NFVOs are reached. In this example, there is no common parent NFVO for "NFVO1" and "NFVO2" to combine their NSs into one that could be mapped to the NwS. They are peer NFVOs of each other. Meaning that they are capable of deploying and managing an NS via their peer NFVO. To enable this "NS1" (realizing "NwSS1") and "NS2" (realizing "NwSS1") can be grouped into a composite NS (named "NS") representing the NwS (operative step 612). This composite NS can be managed by either "NFVO1" or "NFVO2" both of which have communication relations to the NwSManager.

A NwS FG may contain NFs which might be necessary in each NS realizing the NwS and its NwSSs (e.g., routing, load balancing). This information can be captured in the NFs of the NwS FG. The assumption is that NFs of this type are supported by all the NwSS managers. However, since the embedding algorithm was applied with the assumption that all VNFs/PNFs realizing the required NFs compose a single simple NS such constraints were not applied. For example, the VNFs/PNFs realizing such NFs were included only once for the single NS. Therefore, once the mapping to NSs is completed the constraints need to be checked and applied to the nested simple NS created during the process as necessary. That is, the VNFs/PNFs realizing these NFs are added to each simple NS if they were not included (operative step 614). For instance, if "NF1" is required in every NS, then "VNF1" will be added with the same performance characteristics to the simple NSs "NS2.1" and "NS2.2" realizing "NwSS2" as well. The placement of the added VNFs could be handled by re-running the embedding routine with appropriate affinity/anti-affinity constraints or could be left to be handled during the NwS instantiation phase.

Figure 7:
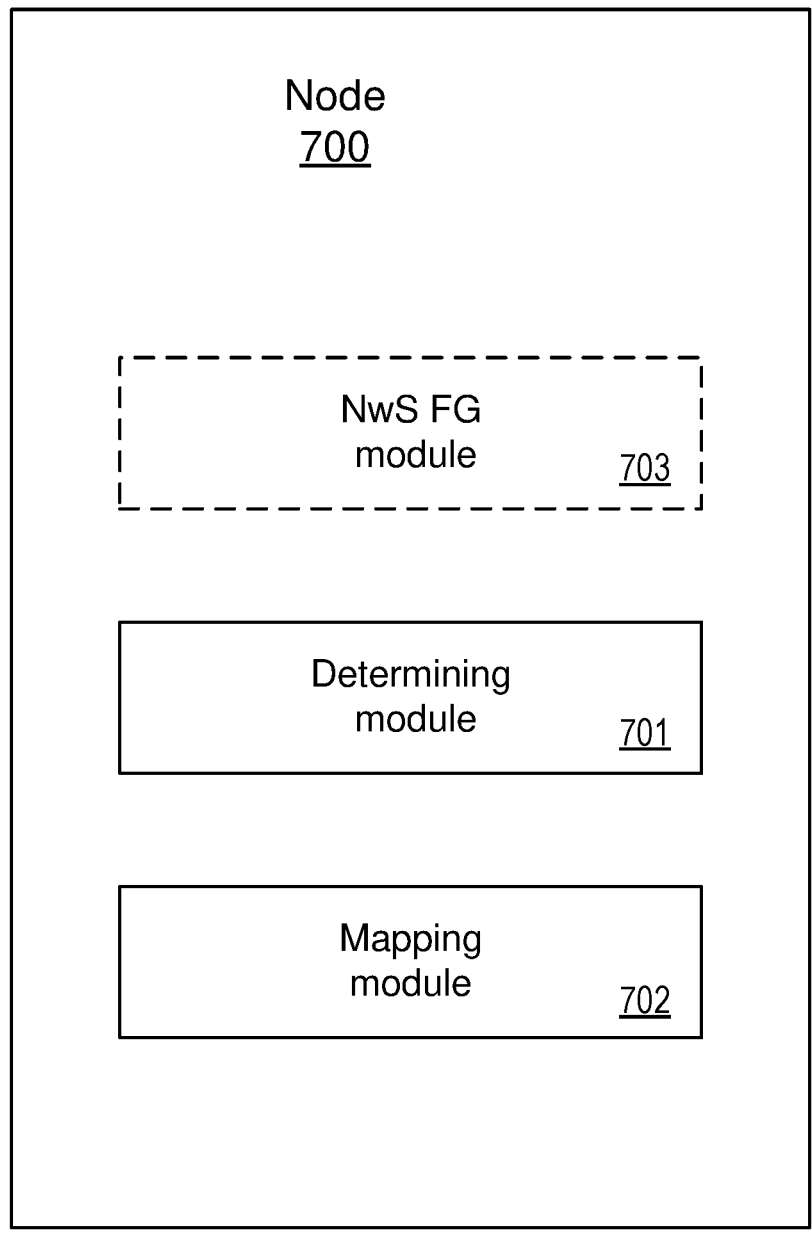
FIG. 7 shows a processing node in accordance with some embodiments of the present disclosure.

FIG. 7 shows a processing node 700 in accordance with some embodiments of the present disclosure. In some embodiments, the node 700 can implement the functions of the method 400 of FIG. 4, as well as the various embodiments described in the disclosure, such as the flow diagrams of FIG. 5 and FIG. 6. As shown, a Determining module 701 can perform operations corresponding to the operations of operative step 401 and process 500. A Mapping module 702 can perform operations corresponding to the operations of operative step 402 and process 600. An optional NwS FG module 703 can perform operations corresponding to the operations of operative step 403.

In some embodiments, the modules 701-703 can be provided as a computer program product, or software, that can include a machine-readable medium having stored thereon instructions, which can be used to program a computer system (or other electronic device) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In some embodiment, the modules of the node 700 are implemented in software. In other embodiments, the modules of the node 700 are implemented in hardware. In further embodiments, the modules of the node 700 are implemented in a combination of hardware and software. In some embodiments, the computer program can be provided on a carrier, where the carrier is one of an electronic signal, optical signal, radio signal or computer storage medium.

Figure 8:
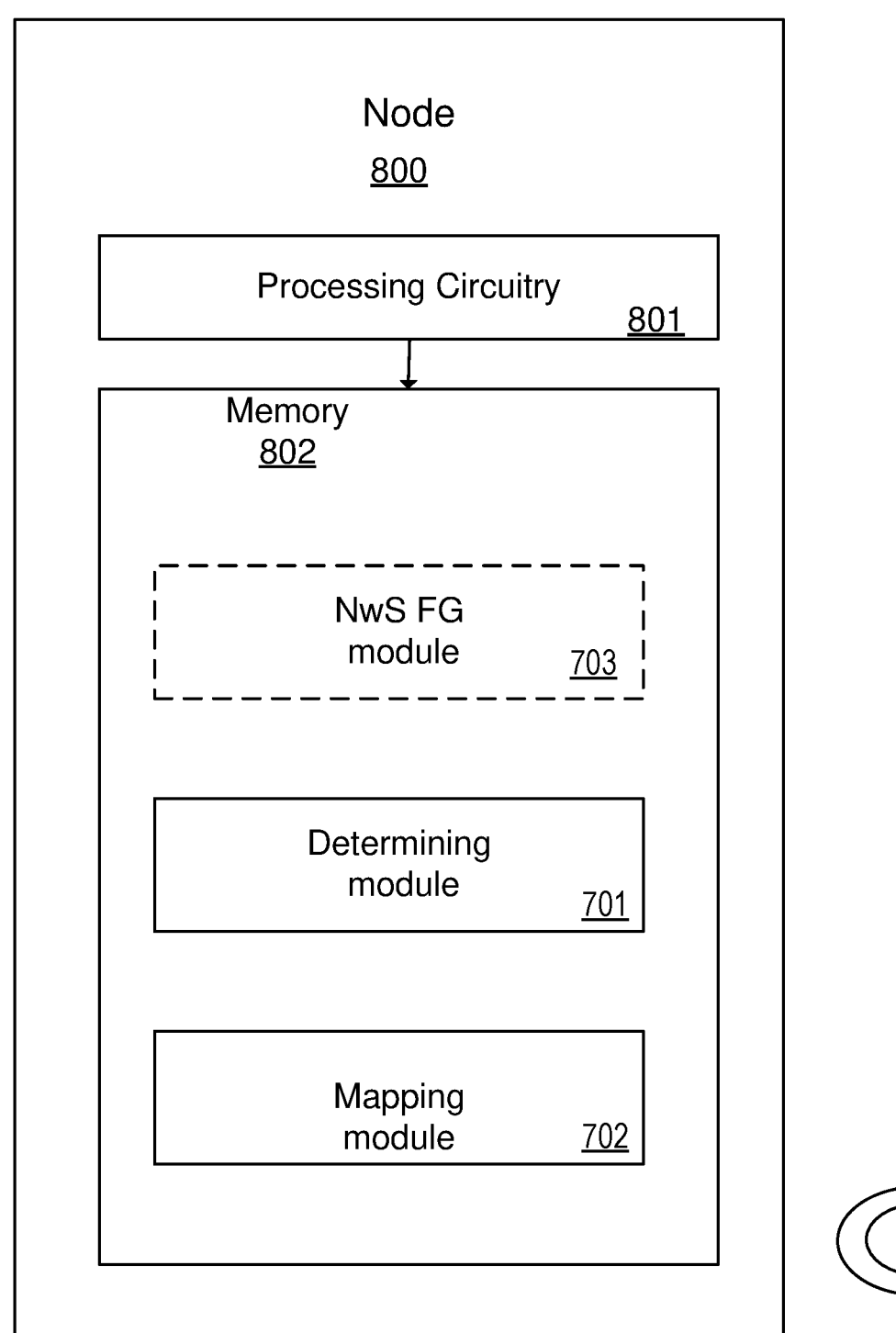
FIG. 8 shows a processing node in accordance with some embodiments of the present disclosure.

FIG. 8 shows a processing node in accordance with some embodiments of the present disclosure. The node 800 can implement the functions of the method 400 of FIG. 4, as well as the various embodiments described in the disclosure, such as the flow diagrams of FIG. 5 and FIG. 6. In some embodiments, the node 800 can be configured to implement the modules 701-703 of FIG. 7, wherein the instructions of the computer program for providing the functions of modules 701-703 reside in a memory 802.

The node 800 comprises processing circuitry (such as one or more processors) 801 and a non-transitory machine-readable medium, such as the memory 803. The processing circuitry 801 provides the processing capability. The memory 802 can store instructions which, when executed by the processing circuitry 801, are capable of configuring the node 800 to perform the methods described in the present disclosure. The memory can be a computer readable storage medium, such as, but not limited to, any type of disk 805 including magnetic disks, optical disks, CD-ROMs, and magnetic-optical disks, read-only memories (ROMs), random access memories (RAMs), EPROMs, EEPROMs, magnetic or optical cards, or any type of media suitable for storing electronic instructions. Furthermore, a carrier containing the computer program instructions can also be one of an electronic signal, optical signal, radio signal or computer storage medium.

Figure 9:
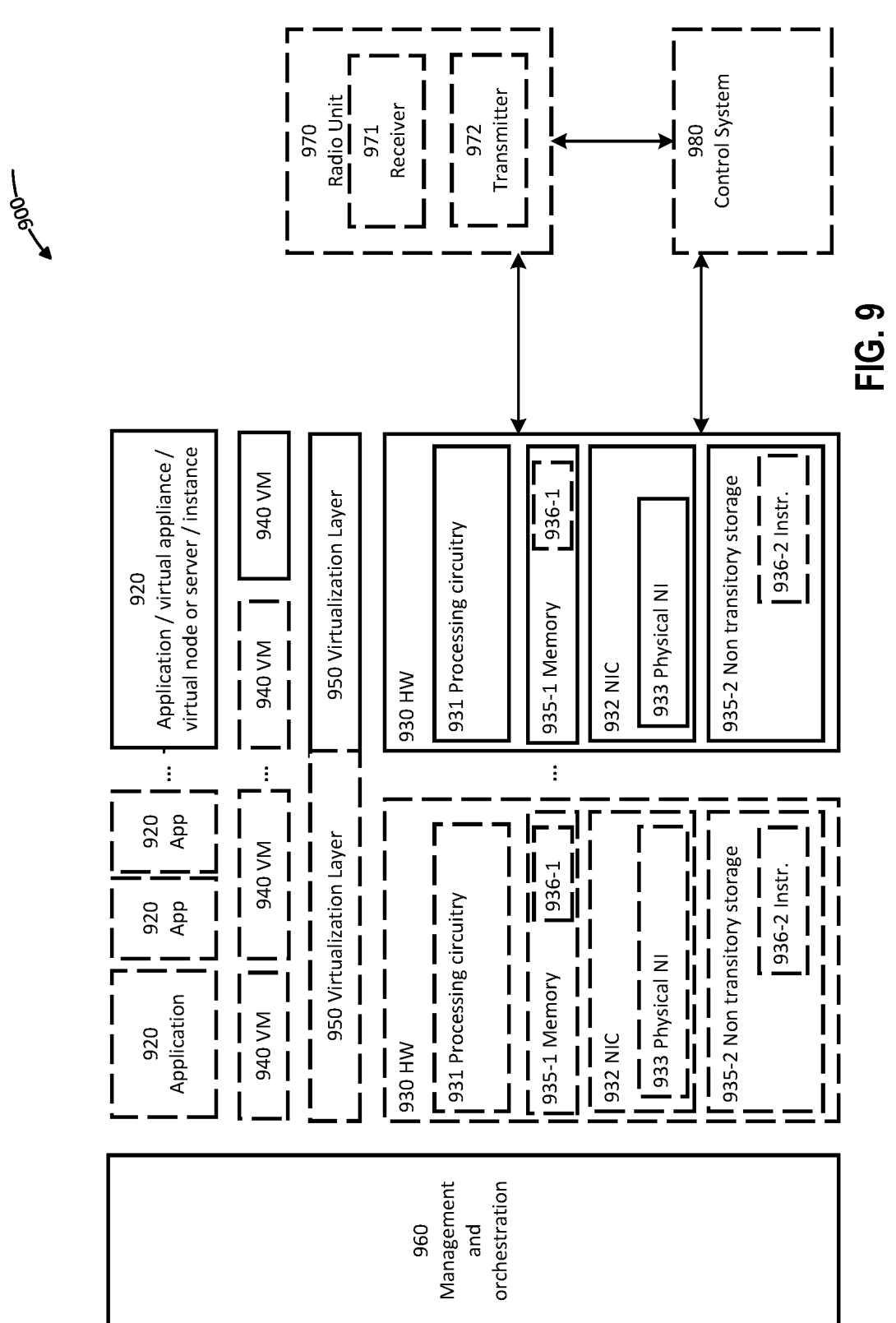
FIG. 9 shows a system for implementing the methods of the disclosure in accordance with some embodiments of the present disclosure.

Although the above described method can be practiced in a variety of environments and systems, FIG. 9 shows one example of a network node which operates in accordance with some embodiments. FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a User Equipment (UE), a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides Hardware (HW) 930 comprising processing circuitry 931 and memory 935. Memory 935 contains instructions 936 executable by processing circuitry 931 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 931, which may be Commercial Off-The-Shelf (COTS) processors, dedicated Application Specific Integrated Circuits (ASICs), or any other type of processing circuitry including digital or analog hardware components or special purpose processors. Each hardware device may comprise memory 935-1 which may be non-persistent memory for temporarily storing instructions 936-1 or software executed by processing circuitry 931. Each hardware device may comprise one or more Network Interface Controllers (NICs) 932, also known as network interface cards, which include physical network interface 933. Each hardware device may also include non-transitory, persistent, machine-readable storage media 935-2 having stored therein software 936-2 and/or instructions executable by processing circuitry 931. Software 936 may include any type of software including software for instantiating one or more virtualization layers 950 (also referred to as hypervisors), software to execute Virtual Machines (VM) 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 931 executes software 936 to instantiate the hypervisor or virtualization layer 950, which may sometimes be referred to as a Virtual Machine Monitor (VMM). Virtualization layer 950 may present a virtual operating platform that appears like networking hardware to virtual machine 940.

As shown in FIG. 9, hardware 930 may be a standalone network node with generic or specific components. Hardware 930 may implement some functions via virtualization. Alternatively, hardware 930 may be part of a larger cluster of hardware (e.g., such as in a data center or Customer Premise Equipment (CPE)) where many hardware nodes work together and are managed via Management And Orchestration (MANO) 960, which, among others, oversees lifecycle management of applications 920.

Virtualization of the hardware is in some contexts referred to as Network Function Virtualization (NFV). NFV may be used to consolidate many network equipment types onto industry standard high volume server hardware, physical switches, and physical storage, which can be located in data centers, and customer premise equipment.

In the context of NFV, Virtual Machine (VM) 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate Virtual Network Elements (VNE).

Still in the context of NFV, Virtual Network Function (VNF) is responsible for handling specific network functions that run in one or more virtual machines 940 on top of hardware networking infrastructure 930 and corresponds to application 920.

In some embodiments, one or more components of the virtualization environment 900, such as HW 930 or MANO 960, can perform the functions of node 700 or 800.

In some embodiments, one or more radio units 970 that each include one or more transmitters 971 and one or more receivers 972. Radio units 970 may communicate directly with hardware nodes 930 via one or more appropriate network interfaces and may be used in combination with the virtual components to provide a virtual node with radio capabilities, such as a radio access node or a base station.

In some embodiments, some signaling can be performed with the use of control system 980 which may alternatively be used for communication between the hardware nodes 930 and radio units 970.

Although the computing devices described herein (e.g., UE, network nodes, hosts, etc.) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Furthermore, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

What is claimed is:

1. A method of providing at least one Network Service (NS) to a Network Slice (NwS) during a design phase of the NwS based on a NwS Forwarding Graph (NwS FG) which comprises Network Functions (NFs) at a functional level, Virtual Network Functions (VNFs) and/or Physical Network Functions (PNFs) at a resource level, and embedding information for embedding the VNFs and/or PNFs (VNFs/PNFs) across more than one domain, the method comprising:
   determining, based on the NwS FG, Network Slice Subnets (NwSSs) for the NwS, wherein NFs comprising the NwS FG are grouped into respective groups to be managed by a respective NwSS manager; and
   mapping the NwSSs to NSs based on Network Function Virtualization Orchestrator (NFVO) assigned to a domain, wherein at least some of the VNFs/PNFs managed by respective NFVOs are mapped to sites across multiple domains determined by the embedding information, wherein the multiple domains comprise an administrative domain and at least one technology domain including one or more of a Radio Access Network (RAN) domain, a Transport Network (TN) domain and a Core Network (CN) domain.

2. The method according to claim 1, wherein the determining the NwSSs for the NwS further comprises at least one leaf NwSS managed by a respective leaf NwSS manager to separate functionalities of a respective parent NwSS.

3. The method according to claim 2, wherein the separate functionalities include control plane functionality and user plane functionality.

4. The method according to claim 1, wherein the determining the NwSSs for the NwS further comprises separating domain types and allowing different management constraints for the domain types.

5. The method according to claim 4, where the domain types include administrative type and technology type.

6. The method according to claim 1, wherein the determining further comprises, for each NwSS, obtaining a list of NFVOs communicating with a respective NwSS manager for that NwSS to determine NFVOs managing multiple domains.

7. The method according to claim 1, wherein the determining further comprises, for each NwSS, obtaining a list of NFVOs communicating with a respective NwSS manager for that NwSS to determine VNF and/or PNF requiring multiple instances at different sites, domains or both sites and domains.

8. The method according to claim 1, wherein the determining further comprises removing VNFs/PNFs and NwSSs embedded in a domain not managed by at least one of the NFVOs.

9. The method according to claim 1, wherein the mapping further comprises, for each VNF/PNF of a respective NwSS, selecting a respective NFVO managing a site embedding that VNF/PNF.

10. The method according to claim 9, wherein the mapping further comprises;
   grouping VNFs/PNFs which have a common NFVO together into an NS;

grouping VNFs/PNFs which have a common NFVO together into an NS and grouping NSs which have a common NFVO into a composite NS; or grouping VNFs/PNFs which have a common NFVO together into an NS, grouping NSs which have a common NFVO into a composite NS, and reducing NSs to a single NS.

11. A node for providing least one Network Service (NS) to a Network Slice (NwS) during a design phase of the NwS based on a NwS Forwarding Graph (NwS FG) which comprises Network Functions (NFs) at a functional level, Virtual Network Functions (VNFs) and/or Physical Network Functions (PNFs) at a resource level, and embedding information for embedding the VNFs and/or PNFs (VNFs/PNFs) across more than one domain, the node comprising:

a processing circuitry; and a memory containing instructions which, when executed by the processing circuitry cause the node to:

determine, based on the NwS FG, Network Slice Subnets (NwSSs) for the NwS, wherein NFs comprising the NwS FG are grouped into respective groups to be managed by a respective NwSS manager, and map the NwSSs to NSs based on Network Function Virtualization Orchestrator (NFVO) assigned to a domain, wherein at least some of the VNFs/PNFs managed by respective NFVOs are mapped to sites across multiple domains determined by the embedding information, wherein the multiple domains comprise an administrative domain and at least one technology domain including one or more of a Radio Access Network (RAN) domain, a Transport Network (TN) domain and a Core Network (CN) domain.

12. The node according to claim 11, wherein to determine the NwSSs for the NwS further comprises at least one leaf NwSS managed by a respective leaf NwSS manager to separate functionalities of a respective parent NwSS.

13. The node according to claim 12, wherein the separate functionalities include control plane functionality and user plane functionality.

14. The node according to claim 11, wherein to determine the NwSSs for the NwS further comprises to separate domain types and allowing different management constraints for the domain types.

15. The node according to claim 14, where the domain types include administrative type and technology type.

16. The node according to claim 11, wherein to determine further comprises, for each NwSS, to obtain a list of NFVOs communicating with a respective NwSS manager for that NwSS to determine NFVOs managing multiple domains.

17. The node according to claim 11, wherein to determine further comprises, for each NwSS, to obtain a list of NFVOs communicating with a respective NwSS manager for that NwSS to determine VNF and/or PNF requiring multiple instances at different sites, domains or both sites and domains.

18. The node according to claim 11, wherein to determine further comprises removal of VNFs/PNFs and NwSSs embedded in a domain not managed by at least one of the NFVOs.

19. The node according to claim 11, wherein to map further comprises, for each VNF/PNF of a respective NwSS, to select a respective NFVO managing a site embedding that VNF/PNF.

20. The node according to claim 19, wherein to map further comprises:

grouping VNFs/PNFs which have a common NFVO together into an NS;

grouping VNFs/PNFs which have a common NFVO together into an NS and grouping NSs which have a common NFVO into a composite NS; or grouping VNFs/PNFs which have a common NFVO together into an NS, grouping NSs which have a common NFVO into a composite NS, and reducing NSs to a single NS.

* * * * *